United States Patent
Hao et al.

(10) Patent No.: US 7,363,306 B1
(45) Date of Patent: Apr. 22, 2008

(54) METHOD AND SYSTEM FOR GRAPHICAL REPRESENTATION

(75) Inventors: Ming C. Hao, Palo Alto, CA (US); Umeshwar Dayal, Saratoga, CA (US); Alex Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 11/045,563

(22) Filed: Jan. 27, 2005

(51) Int. Cl.
*G06F 7/00* (2006.01)
(52) U.S. Cl. .............................. 707/10; 707/101; 705/1
(58) Field of Classification Search .................... None
See application file for complete search history.

(56) References Cited

U.S. PATENT DOCUMENTS

| | | | |
|---|---|---|---|
| 5,742,778 A | | 4/1998 | Hao et al. |
| 5,828,866 A | | 10/1998 | Hao et al. |
| 5,893,087 A | * | 4/1999 | Wlaschin et al. .............. 707/3 |
| 5,911,138 A | * | 6/1999 | Li et al. ......................... 707/3 |
| 6,078,924 A | * | 6/2000 | Ainsbury et al. ........... 707/101 |
| 6,377,287 B1 | | 4/2002 | Hao et al. |
| 6,721,713 B1 | * | 4/2004 | Guheen et al. ................ 705/1 |
| 6,845,380 B2 | | 1/2005 | Su et al. |
| 2004/0080514 A1 | | 4/2004 | Dorwart |

OTHER PUBLICATIONS

Tableau Software Brochure entitled Tableau: The Visual Spreadsheet.

* cited by examiner

*Primary Examiner*—John Cottingham
*Assistant Examiner*—Noosha Arjomandi (57) ABSTRACT

There is provided a method for displaying data comprising mapping a column set that comprises information stored in a first layer column, mapping a row set that comprises information stored in a second layer column, wherein the second layer column is associated with the first layer column, and rendering a graphic using the column set and the row set, wherein a visual attribute of the graphic corresponds to a data value stored in a data column.

21 Claims, 5 Drawing Sheets

FIG. 1

|  | 52 | 54 | 56 | 58 | 60 |
|---|---|---|---|---|---|
| 62 → | Company | Region | Product | Sales | Quantity |
| 64a → | a1 | b1 | c1 | 10 | 2 |
| | a1 | b1 | c2 | 40 | 3 |
| | a1 | b2 | c1 | 79 | 5 |
| | a1 | b2 | c2 | 69 | 6 |
| | a2 | b1 | c1 | 60 | 4 |
| | a2 | b1 | c1 | 78 | 8 |
| | a2 | b1 | c2 | 60 | 5 |
| | a2 | b2 | c1 | 70 | 6 |
| | a2 | b2 | c2 | 30 | 3 |
| | a2 | b2 | c2 | 80 | 7 |
| | a3 | b1 | c1 | 98 | 10 |
| | a3 | b1 | c2 | 100 | 12 |
| | a3 | b2 | c1 | 110 | 9 |
| 64n → | a3 | b2 | c2 | 150 | 15 |

METHOD AND SYSTEM FOR GRAPHICAL REPRESENTATION

BACKGROUND

This section is intended to introduce the reader to various aspects of art, which can be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Graphical representations, such as spreadsheets, are widely used by analysts in many different industries to report and analyze large amounts of categorical information. To understand the information presented on a traditional electronic spreadsheet, a user has to scroll through many pages of textual tables. This can be a tedious and difficult task that can become even more difficult as the amount of information stored in the spreadsheet increases.

One traditional method for easing this problem is with simple graphical charts. Simple charts, however, have numerous disadvantages that can hinder the efficient display of large amounts of information. Simple charts typically provide a single solid color bar or line. Simple charts also lack the resolution needed to allow the requisite level of analysis of large amounts of data. Lastly, it is difficult to quickly find correlations, differences, or patterns among data in simple charts.

SUMMARY

Certain aspects of embodiments disclosed herein by way of example are summarized below. It should be understood that these aspects axe presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

There is provided a system and method for graphically representing textual spreadsheet data. In one embodiment, there is provided a method for displaying data comprising mapping a column set that comprises information stored in a first layer column, and mapping a row set that comprises information stored in a second layer column. The second layer column may be associated with the first layer column. Further, in one embodiment, the method includes rendering a graphic using the column set and the row set, wherein a visual attribute of the graphic corresponds to a data value stored in a data column.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, which can vary from one implementation to another. Moreover, it should be appreciated that such a development effort might be complex and time consuming but would nevertheless be a routine understanding of design, fabrication, and manufacture for those of ordinary skill having the benefit of this disclosure.

Figure 1:
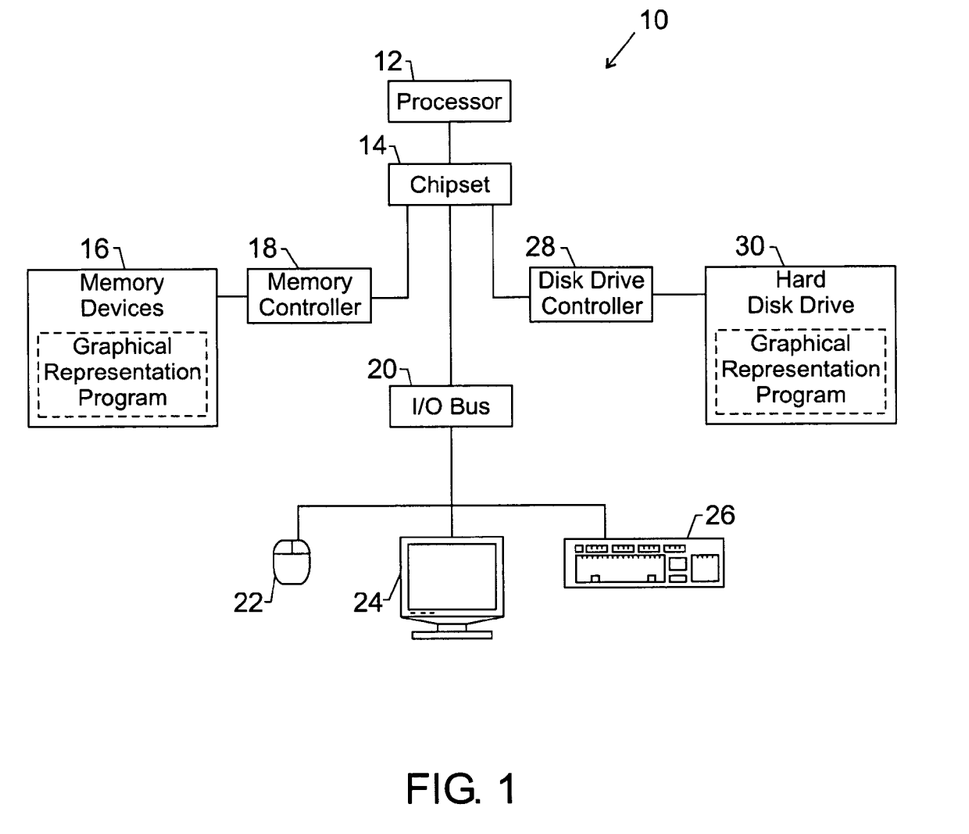
FIG. 1 is a block diagram illustrating one embodiment of a computer system for creating a graphical representation.

FIG. 1 is a block diagram that illustrates one embodiment of a computer system 10 for creating a graphical representation. In one embodiment, the computer system 10 includes one or more processors or central processing units ("CPUs") 12. The CPUs 12 can be used individually or in combination with other CPUs. While the CPU 12 will be referred primarily in the singular, it will be understood by those skilled in the art that a computer system 10 with any number of physical or logical CPUs 12 can be implemented. Examples of suitable CPUs 12 include the Intel Pentium 4 Processor and the AMD Athlon Processor.

In one embodiment, a chipset 14 is operably coupled to the CPU 12. The chipset 14 is a communication pathway for signals between the CPU 12 and other components of the computer system 10, which can include a memory controller 18, an input and output ("IO") bus 20, and a disk drive controller 28. Depending on the configuration of the system, any one of a number of different signals are transmitted through the chipset 14. Those skilled in the art will appreciate that the routing of signals throughout the computer system 10 can be readily adjusted without changing the underlying nature of the system.

The memory controller 18 is operably coupled to the chipset 14 in one embodiment. In alternate embodiments, the memory controller 18 is integrated into the chipset 14. The memory controller 18 can be operably coupled to one or more memory devices 16. In one embodiment, the memory devices 16 are any one of a number of industry standard types of tangible computer-usable mediums or memory including, but not limited to, single in line memory modules ("SIMMs") and dual in line memory modules ("DIMMs"). In certain embodiments, the memory devices 16 facilitate creating a graphical representation by storing data values. In one embodiment, the memory devices 16 store a large set of spreadsheet values. The chipset 14 can also be coupled to the IO bus 20. The IO bus 20 serves as a communication pathway for signals from the chipset 14 to IO devices such as a mouse 22, a video display 24, or a keyboard 26.

The disk drive controller 28 is also operably coupled to the chipset 14. The disk drive controller 28 is operably coupled at a hard disk drive 30 and controls communication between the chipset 14 and the hard disk drive 30. Those skilled in the art will appreciate that a single hard disk drive 30 is shown in FIG. 1 for illustrative purposes only. In alternate embodiments, there can be more than one hard disk drive 30. Further, in still other embodiments, the hard drive 30 is coupled to the IO bus 20 or communicates with the chipset 14 via the IO bus 20. The hard disk drive 30 facilitates creating a graphical representation by storing data values.

Figure 2:
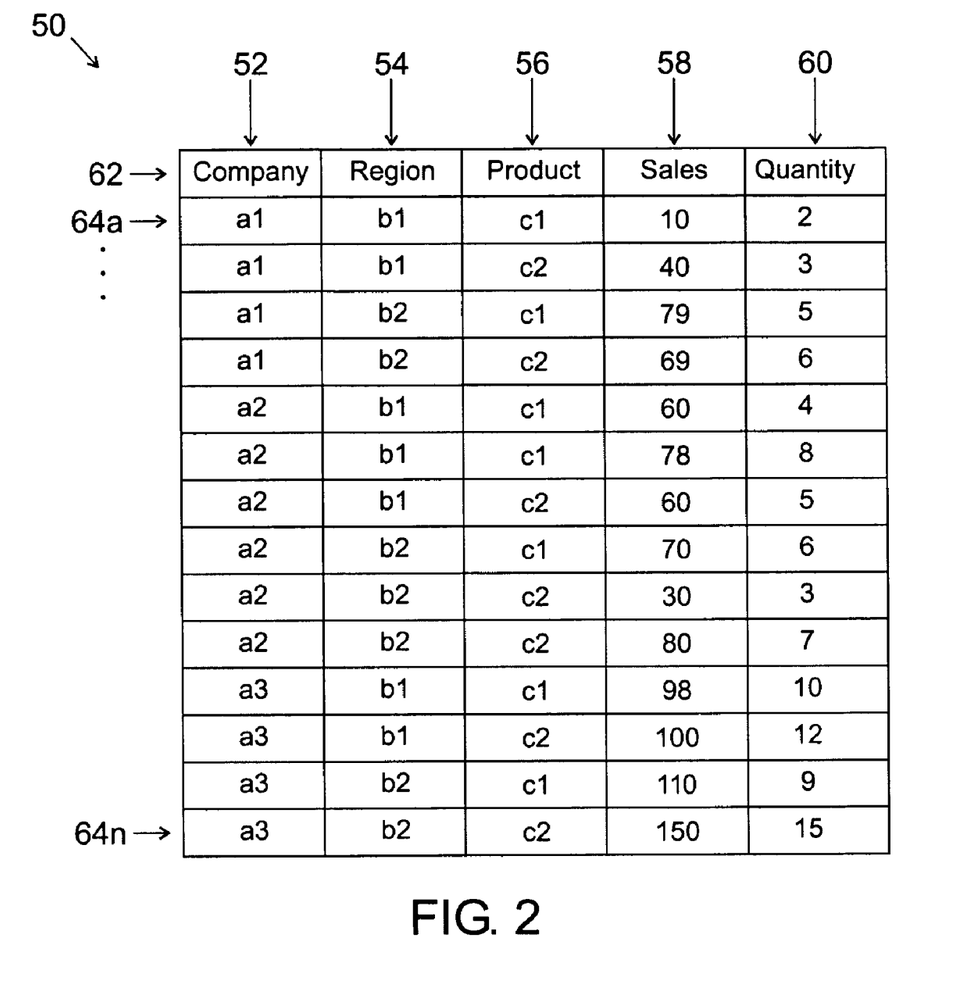
FIG. 2 illustrates one embodiment of a textual spreadsheet.

FIG. 2 illustrates one embodiment of a textual spreadsheet 50. In one embodiment, the spreadsheet 50 comprises of a series of columns 52-60 and a series of rows 62 and 64a-64n. The spreadsheet 50 is illustrated with five columns and fifteen rows for ease of illustration only. In alternate embodiments, the spreadsheet 50 can include virtually any number of rows or columns.

In one embodiment, the spreadsheet 50 comprises a series of information storage locations formed by the intersection of the columns 52-60 and the rows 62 and 64a-64n. In one embodiment, these information storage locations are referred to as cells. Each of these cells is capable of storing a piece of information, such as a number or a word. The cells in the row 62, which is referred to as title cells, contains a title for the corresponding column. For example, the cell formed by the intersection of the column 52 and the row 62 contains the word "Company." As such, the title for the column 52 is "Company," and the information stored in the column 52 are the names of various companies. Those skilled in the art will appreciate that storing the title of the column in the row 62 is merely a convention.

As shown in FIG. 2, each of the columns 52-60 also contain information in the cells on rows 64a-64n. Each of the cells on rows 64a-64n contains either numbers or words. If a particular cell contains a number, it is considered a data cell, and if it contains a word or a date, it is considered a layer cell. If a cell contains no information, it is referred to as a blank cell. Those columns that contain data cells, blank cells, or title cells, such as the columns 58 and 60 from FIG. 2, are referred to as data columns whereas those columns that contain layer cells, blank cells, or title cells, such as the columns 52-56, are referred to as layer columns. In alternate embodiments, a column can contain any mix of data cells, layer cells, or blank cells.

As stated above, the information stored in the cells on the rows 64a-64n is related to the title of the column. For example, in regards to the column 52, the rows 64a-64n contains information related to particular companies. In particular, the rows 64a-64n in the spreadsheet 50 are shown to contain the names of three fictional companies, "a1," "a2," and "a3." Those skilled in the art, however, will appreciate that both the title of the column 52 and the information stored within the column 52 will vary depending on what information is being stored in the spreadsheet 50 and why the information is being stored. The columns 54-60 can also contain information related to their respective titles.

The information stored in one or more of the columns 52-60 is typically related to information stored within another one of the columns 52-60. For example, in the spreadsheet 50, the "Region" information stored in the column 54 is related to the "Company" information stored in the column 52. The information stored in one of the columns 52-60 is a sub-layer or subset of one of the other columns 52-60. These column relationships can be manually entered by a user of the computer system 10 or automatically set the computer system 10. As will be described in greater detail below, in the case of the spreadsheet 50, columns 58 and 60 can be related to the column 56, which is a sub-layer of the column 54, which is affiliated with the column 52. Specifically, with the row 64a, the data cells "10" and "2" provides sales and quantity information related to the product "c1" in the region "b1" for the company "a1." This hierarchical structure will be described in greater detail below.

Figure 3:
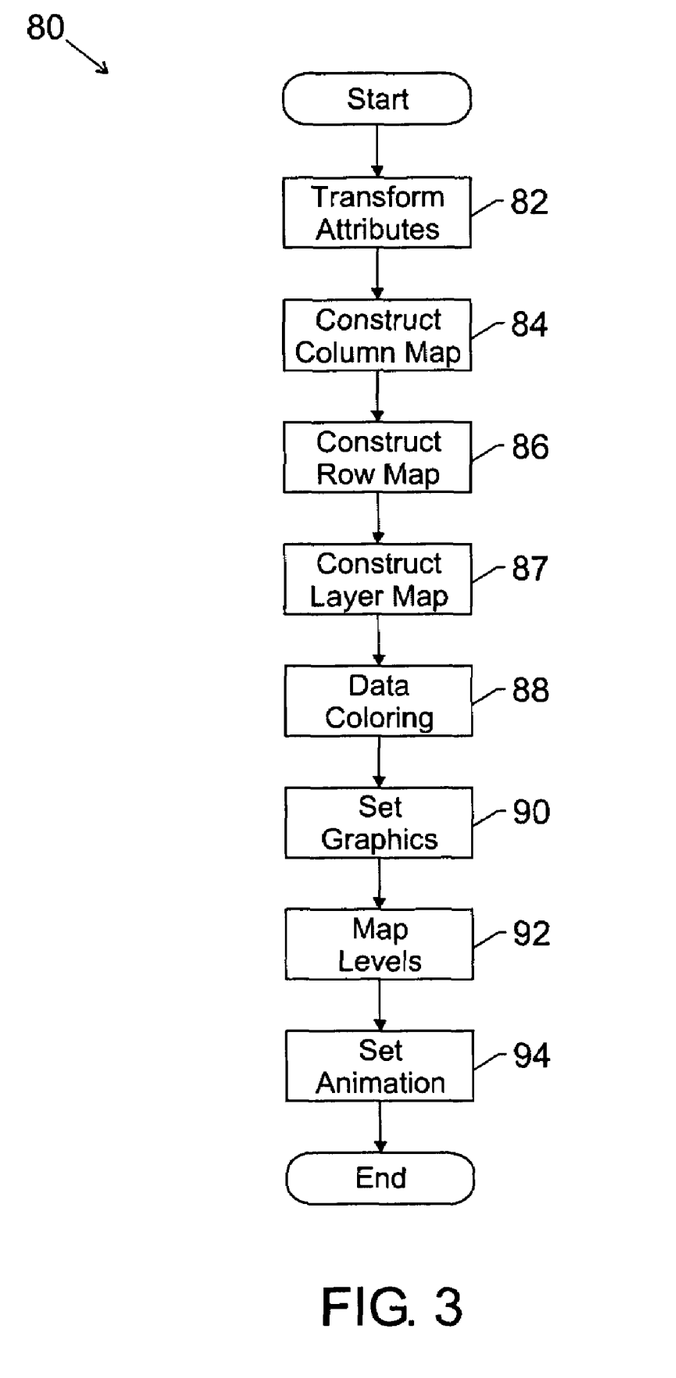
FIG. 3 is a block diagram illustrating one embodiment of an exemplary method for creating a graphical representation.

FIG. 3 illustrates one embodiment of an exemplary method 80 for creating a graphical representation. In one embodiment, the graphical representation is a graphical spreadsheet. Those skilled in the art will appreciate that the exemplary method 80 is particular useful in applications involving large data sets. As indicated by block 82, the first step in creating a graphical representation is to transform the attributes of a textual spreadsheet into a row and column format such that there are layer columns and data columns. As described above, the spreadsheet 50 is already arranged in this format. However, in alternate embodiments, the spreadsheet 50 is not arranged in this format. In this case, the first step in the creating a graphical representation is to arrange the information in the spreadsheet 50 into layer columns and data columns. For example, in one alternate embodiment, there could be layer rows or data rows. In this embodiment, it is helpful to rearrange the data rows into data columns and the layer rows into layer columns. In other embodiments, the columns 52-60 comprise both data cells and layer cells. In this case, transforming the attributes will comprise separating the columns into data columns and layer columns. In yet another embodiment, transforming the attributes comprises converting another type of data structure, such as a linked list, into a textual spreadsheet arranged into layer columns and data columns.

Figure 4:
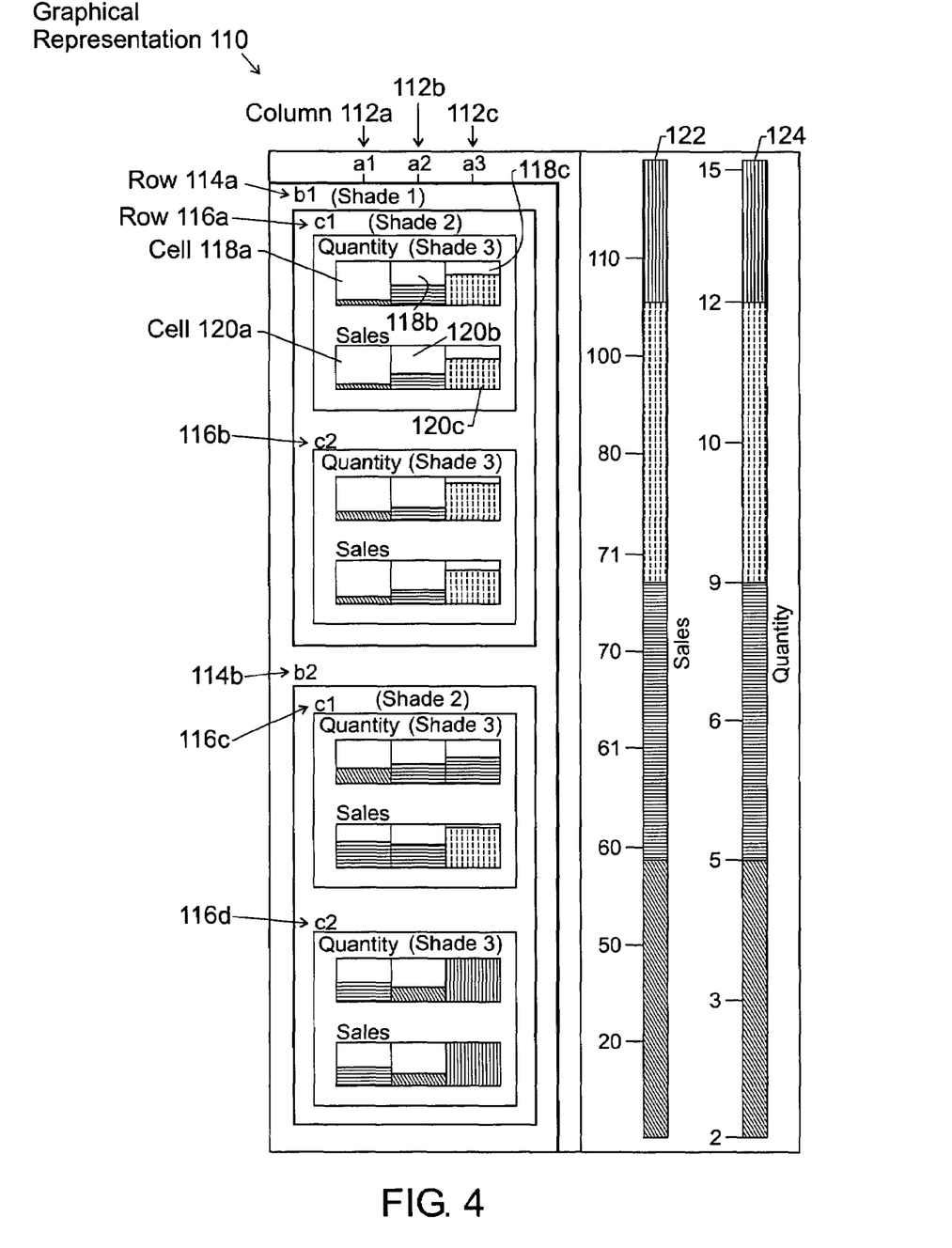
FIG. 4 is a diagram illustrating one embodiment of an exemplary graphical representation.

After the attributes have been transformed, a column map is constructed, as illustrated in block 84. Constructing the column set, also known as column mapping, comprises selecting which layer columns will form the columns of the graphical representation. For example, FIG. 4 illustrates one embodiment of a graphical representation 110 formed using spreadsheet 50 of FIG. 2. In the graphical representation 110, the column 52 from the spreadsheet 50 has been selected to form the columns 112a-112c of the visual spreadsheet. For this reason, the columns 112a-112c are labeled "a1," "a2," and "a3," because "a1," "a2," and "a3" are the three different company names stored in the column 52 of the spreadsheet 50.

In the case of the columns 112a-112c, the column map was created from a single column 52 of the spreadsheet 50. In alternate embodiments, the column titles are based on multiple layer columns from the spreadsheet 50. If multiple layer columns of the spreadsheet 50 are mapped as columns, the columns are nested in a hierarchical structure using the relationships set up between the columns being mapped. In addition, as will described in greater detail below, if the multiple columns are related as layer and sub-layer, the columns in the graphical representation 110 can be mapped with different visual attributes, such as colors or shades. The column mapping is performed either manually by the user selecting one or more of the columns of the spreadsheet 50 or automatically by the computer system 10 that was described above in regard to FIG. 1.

Once the columns 112a-112c have been mapped, the process 80 continues by constructing a row set, as indicated in block 84. Constructing a row set is also referred to as row mapping. Row mapping begins by selecting which layer columns will form the rows of the graphical representation 110. The rows of the graphical representation 110 are formed from one or more layer columns from the spreadsheet 50. In one embodiment, row mapping comprises selecting all of the remaining layer columns from the spreadsheet 50 that were not mapped as columns in the graphical representation 110. In another embodiment, row mapping comprises selecting less than all of the layers columns that were not mapped as columns. As with the column mapping described above, this selection can either be performed manually by the user or automatically by the computer system 10. In the case of the graphical representation 110 shown in FIG. 4, both of the remaining layer columns (columns 54 and 56) were selected, with the region information from the column 54 being mapped as rows 114a and 114b and the product information from the column 56 being mapped as rows 116a-116d. In this way, as shown in FIG. 4, the graphical representation 110 forms a hierarchical grid of columns and rows.

After the rows of the graphical representation 110 have been mapped, the process 80 continues by constructing a layer set, as indicated in block 87. The layer set reflects relationships between the rows of the spreadsheet 50. For example, in the spreadsheet 50, the layer column 56 ("product") can be a sub-layer of the layer column 54 ("region"). For this reason, an exemplary layer map for the spreadsheet 50 includes information indicting that the column 56 is a sub-layer of the column 54. In one embodiment, when the layers are mapped, each layer and sub-layers is marked with a visual attribute, such as a color or a shade, or nested to indicate the relationships between the layers (i.e., between the rows or columns of the graphical representation 110). For example, in the graphical representation 110, the rows 114a and 114b are shaded in one shade or color (indicated by the label "Shade 1" in FIG. 4), the rows 116a-116d shaded in a different shade or color (indicated by the label "Shade 2" in FIG. 4), and the data cells 118a-118c and 120a-120c, which will be described in greater detail below, shaded in yet another shade or color (indicated by the label "Shade 3" in FIG. 4). In this way, it is possible for a user of the graphical representation 110 to rapidly distinguish between the various layers and sub-layers based on shading. In other words, the variety of shading or colors give the graphical representation 110 comparative depth between the rows. For example, the rows 114a and 114b are illustrated to appear at a different depth than the rows 116a-116d due to the difference in color or shading. In one embodiment, sub-layers are shaded darker than their associated parent layers.

After the layer set has been constructed, visual attributes, such as a color, are assigned to the data items stored in the data columns, as indicated in block 88. The first step in data coloring comprises selecting which data columns are to be displayed in the graphical representation 110. In one embodiment, all of the data columns in the spreadsheet 50 are displayed in the spreadsheet. In another embodiment, less than all of the data columns are displayed. As with the column mapping and the row mapping described above, this selection is either performed manually by the user or automatically by the computer system 10. In the case of the graphical representation 110 shown in FIG. 4, both the data columns (columns 58 and 60) were selected to be displayed.

Once the data columns to be displayed have been selected, colors are be assigned. Specifically, color can be assigned to the data stored in the data columns 58 and 60 to assist a viewer of the graphical representation 110 to determine the values of the data displayed. For example, in the graphical representation 110, the data columns 58 and 60 are displayed as graphical bars in quantity data cells 118a-118c and sales data cells 120a-120c respectively. These graphical bars are color coded (as indicated by the fill patterns) according to the value of a corresponding data cell in the spreadsheet 50.

In one embodiment, the data stored in one of the data columns 58 and 60 can be color coded by first determining the highest valued information and the lowest valued information in each of the data columns. For example, with the data column 58, the highest valued information would be 150 and the lowest valued information would be 10. Once these highest and lowest values are selected, a color scale is projected onto the range of values between the highest and the lowest value. This color scale is used to assign colors to particular data cells in the spreadsheet 50. These assigned colors are then used as the color of the graphical bars in the quantity data cells 118a-118c and the sales data cells 120a-120c.

In one embodiment, the color scale comprises a series of distinct color bands that are associated with different values between the highest value and the lowest value. In one embodiment, these color bands are displayed in one or more legends located on the graphical representation 110. For example, looking at sales legend 122 in FIG. 4, there are four different color bands (represented in FIG. 4 by different fill patterns) between the lowest value of 10 and the highest value of 150. Each of the cells in the column 58 is assigned a color corresponding to which color band its value falls within. The boundaries of each color band and the particular colors chosen are either selected manually by the user or selected automatically by the computer system 10. In one embodiment, the graphical representation 110 also comprises a legend for each data column being displayed. For example, the graphical representation 110 comprises the sales legend 122, which corresponds to the column 58, and quantity legend 124, which corresponds to the column 60. Each of the legends 122 and 124 in the graphical representation 110 can employ the same color scale (as in FIG. 4) or the color scales can differ. In an alternate embodiment, the color scale comprises a gradient of color instead of distinct color bands.

Once the colors have been assigned, the graphical style is set, as indicated in block 90. The graphical style can be any form of graphics or chart that can be used to graphically display information. Examples of suitable graphical styles include, but are not limited to, bar graphs, line charts, or pie graphs. The graphical style is either selected manually by the user or selected automatically by the computer system 10.

Once the graphical style has been selected, the data contained in the data columns are graphically rendered. Those skilled in the art will appreciate that the rendering process will vary depending on which graphical style was selected. If the graphical style is a line chart, the rendering process will comprise rendering a series of graphical lines corresponding to the data cells in columns 58 and 60. These graphical lines are displayed in a hierarchical structure wherein the line charts are arranged in a row and column format based on which layer columns have been selected to be displayed. Similarly, if the graphical style is a bar graph, the rendering process will comprise rendering a series of graphical bars corresponding to the data columns 58 and 60. As with the line charts above, the graphical bars can be displayed in a hierarchical structure wherein the graphical bars are arranged in a row and column grid based on which layer columns have been selected to be displayed. In alternate embodiments, the graphical style can comprise an icon, a line chart, a pistol bar chart, a pie chart, or an oval representation.

In one embodiment, graphical rendering comprises a determination of the highest valued information and the lowest valued information stored in one of the data columns in the spreadsheet 50. These highest and lowest values are then be associated with the top and the bottom of a particular one of the quantity data cell 118a-118c or a particular one of the sales data cells 120a-120c. Once a value has been associated with the top and bottom of each of the data cells, each one of the data cells from the data columns of the spreadsheet 50 is rendered as a graphical bar whose height corresponds to where the value of the particular data cell falls between the highest and lowest data values for a particular data column. The same process is used for the quantity data cells and sales data cells located in the rows 116b-116d.

Specifically, the graphical representation 110 comprises quantity data cells 118a-118c and sales data cells 120a-120c wherein the quantity data cell 118a corresponds to the information stored in the cell at the junction of row 64a and column 58 of the spreadsheet 50. Because the value of this data cell is 10, which is at the bottom end of the value range of the column 58, the height of the graphical bar for the quantity data cell 118a is quite short. The quantity data cell 118c, on the other hand, corresponds to the information stored in the cell at the junction of row 64k and column 58 of the spreadsheet 50. Because the value of this data cell is 98, the height of the graphical bar for the quantity data cell 118c is approximately two-thirds of the total height of the quantity data cell 118c. This is the case because 98 is approximately two-thirds of the way between the bottom (10) end and the top end (150) of the value range in the column 58. Because the height of each graphical bar corresponds to the relative data value of one of the data cells from the spreadsheet 50 in proportion to the values of the other data cells in the same data column from the spreadsheet 50, it is possible for an observer of the graphical representation 110 to visually determine a relative value for each one of the data cells by looking at the graphical representation 110.

In alternate embodiments, the user is able to manually select which data values correspond to a particular graphical bar height. In yet another embodiment, a non-linear scale, such as a logarithmic scale, is used to determine the height of the graphical bars in the sales data cells 120a-120c and the quantity data cells 118a-118c.

Once the graphics have been set, the levels of the spreadsheet are mapped, as indicated in block 92. This procedure, known as level mapping, permits the user of the graphical representation 110 to configure the graphical representation 110 to drilldown through different levels of information. This option can be implemented when there are data columns in the spreadsheet 50 that are subsets of other data columns in the spreadsheet 50. In this case, it is desirable to display a top level data column on the graphical representation 110, but still have the capability to display the information contained in the subset data columns upon demand. For example, the spreadsheet 50 could contain additional data columns that provide information on which sales people were responsible for which of the sales listed in column 58. In one embodiment, a user does not want this salesperson information to be regularly displayed on the graphical representation 110, but still want the option of drilling down to this information on demand. In one embodiment, drilling down comprises expanding the graphical representation 110 to display additional data cells or comprises the creation of a new graphical representation to display the additional data cells. In this case, the process of column mapping, row mapping, and data coloration described above will be repeated for the new graphical representation.

Level mapping allows the graphical representation 110 to support the drilldown feature described above. Level mapping comprises setting relationships between the data columns in the spreadsheet 50. Setting these relationships typically involves designating which data columns are subsets of other data columns. In one embodiment, level mapping also comprises selecting which data columns will be displayed at each particular drilldown level. In one embodiment, these selections comprise starting the process 90 for those columns on the spreadsheet 50 that will be used to create the drilldown graphical representation. In another embodiment, the mapped columns and rows from the graphical representation 110 are maintained. In this embodiment, the data cells 118a-118c and 120a-120c would change to reflect these selections.

In one embodiment, the user is able to drilldown into a data cell, such as the data cell 120a, by clicking a button on the mouse 22 when a graphical pointer is pointing to the data cell. In an alternate embodiment, the user is able to drill down by pressing a key on the keyboard 26.

In one embodiment, after the layers have been mapped, the graphical representation is animated, as illustrated in block 94. Animation can be employed in the graphical representation 110 if the number columns or rows are so large that all of the columns or all of the rows can not be practically displayed on a single page of the graphical representation 110. For example, if the spreadsheet 50 comprised one hundred different companies instead of three companies, it could be impractical to display all one hundred columns worth of information on a single display. In this case, the graphical representation 110 can be configured to animate the columns of the graphical representation 110 to automatically scroll through each of the companies. In another embodiment, the graphical representation 110 is animated to display a real-time series of data. In another embodiment, a slide bar is added to the graphical representation 110. The slide bar allows a user to manually scroll through the columns or rows of the graphical representation 110.

As a final step, the graphical representation 110 is visually displayed on the display 24. In alternate embodiments, the graphical representation 110 is displayed on the display 24 as the process 90 is being performed or the graphical representation 110 is stored in the memory devices 16 or the hard disk drive 30 for later display.

Figure 5:
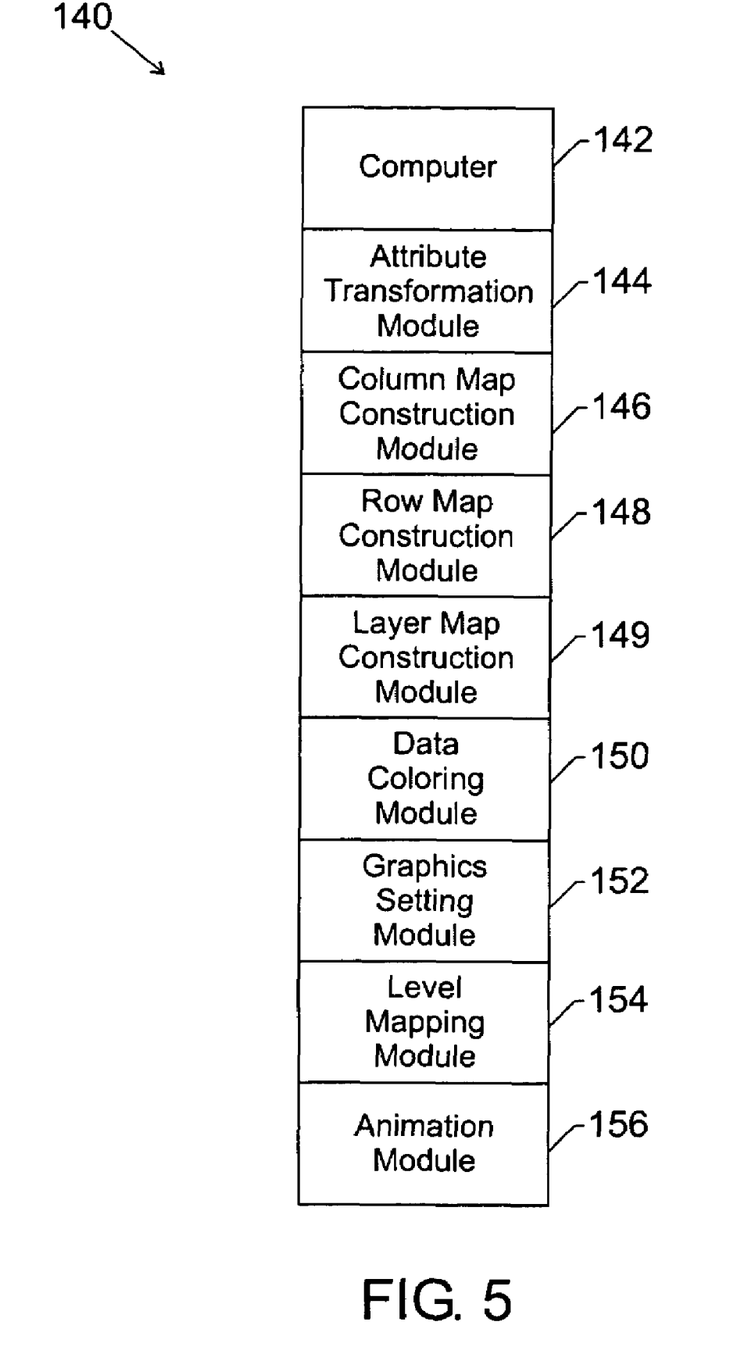
FIG. 5 is a block diagram illustrating one embodiment of a computer system in accordance with one embodiment of the present invention.

FIG. 5 is a block diagram of a computer system 140 in accordance with one embodiment of the present invention. Specifically, block 142 of FIG. 5 represents a computer. The computer (block 142) comprises or interacts with modules represented by blocks 144-156, thus allowing for application of the method presented in FIG. 3. The modules (blocks 144-156) are hardware, software or some combination of hardware and software. Additionally, an individual module may not necessarily solely comprise each module function as illustrated. In other words, the modules shown in blocks 144-156 are merely one example and other embodiments can be envisaged wherein the functions are split up differently or wherein some modules are not included and other modules are included. The illustrated modules (blocks 144-156) comprise: an attribute transformation module (block 144) that arranges information into layer columns and data columns, a column map construction module (block 146) that creates a column map for the graphical representation 110, a row map construction module (block 148) that creates a row map for the graphical representation 110, a layer map construction module (block 149) that creates a shaded layer map for the graphical representation 110, a data coloring module (block 150) that colors the data cells of the graphical representation 110, a graphics setting module (block 152) that renders the data cells of the graphical representation 110, a level mapping module (block 154) that associates the data cells of the graphical representation with a second graphical representation, and an animation module (block 156) that animates the graphical representation 110. In this embodiment and in other envisaged computer system embodiments, a user incorporates the functionality of a computer to enhance the performance of the process 90 discussed previously. For example, the computer (block 142) can convert a textual spreadsheet 50 into a graphical representation, such as the one illustrated by FIG. 4 by utilizing the modules represented by blocks 142-156.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for graphically representing textual spreadsheet data, the method comprising:
   transforming attributes of a textual spreadsheet, wherein transforming the attributes comprises sorting information stored in the textual spreadsheet into at least one layer column and at least one data column based on whether the information includes a data cell or a layer cell;
   mapping a column set that comprises information stored in a first layer column;
   mapping a row set that comprises information stored in a second layer column, wherein the second layer column is associated with the first layer column; and
   rendering a graphic using the column set and the row set, wherein a visual attribute of the graphic corresponds to a data value stored in the at least one data column.

2. The method of claim 1, further comprising rendering a legend, wherein the legend comprises a range of data values stored in the data column and visual attributes that correspond to the range of data values.

3. The method of claim 2, wherein rendering the legend comprises rendering a color gradient.

4. The method of claim 1, wherein mapping the row set comprises mapping a plurality of layer columns, wherein the plurality of layer columns are related to each other in a layer and sub-layer relationship.

5. The method of claim 4, further comprising mapping a layer set, wherein mapping the layer set comprises marking a first row with a first visual attribute and marking a second row with a second visual attribute, wherein the second row is a sub-layer of the first row.

6. The method of claim 4 further comprising mapping a layer set, wherein the layer set illustrates a comparative depth for the rows in the row set.

7. The method of claim 1, wherein rendering the graphic comprises rendering a graphical bar with a height corresponding to the data value.

8. The method of claim 1, wherein rendering the graphic comprises rendering an icon, a line chart, a pistol bar chart, a pie chart, or an oval representation.

9. The method of claim 1, comprising:
   creating another graphic;
   associating the another graphic with the graphic; and
   configuring the graphic to drilldown to the another graphic when the graphic is selected.

10. The method of claim 1, further comprising animating the graphic.

11. The method of claim 1, further comprising adding a slider bar to the graphic.

12. The method of claim 1, wherein rendering a graphic comprises rendering a plurality of graphics on the graphical representation.

13. The method of claim 12, wherein the plurality of graphics comprises a spreadsheet.

14. A method for graphically displaying data from a textual spreadsheet, the method comprising: transforming attributes of the textual spreadsheet wherein transforming the attributes comprises sorting information stored in the textual spreadsheet into at least one layer column and at least one data column based on whether the information includes a data cell or a layer cell; associating a plurality of Visual attributes with a plurality of data values; rendering a plurality of graphics in a graphical spreadsheet representing a plurality of data values stored in the textual spreadsheet, wherein each of the plurality of graphics is rendered with a visual attribute associated with the data value represented by the graphic; and arranging the plurality of graphics representing the plurality of data values in a row and column format in the graphical spreadsheet, wherein each of the location of the plurality of graphics is located within the row and column format based on using an association of a corresponding data value of the plurality of data values with the at least one layer column or at least one data column layer information associated with the data value.

15. The method of claim 14, further comprising rendering a legend, wherein the legend includes the plurality of data values and the colors that correspond to the plurality of data values.

16. A computer system for providing a graphical representation of data, the computer system comprising: a memory; a processor; an attribute transformation module stored on the memory that arranges information stored in a data structure into at least one layer column and at least one data column; a column map construction module stored on the memory that constructs a column map on a graphical representation using a first layer column, a row map construction module stored on the memory that constructs a row map on the graphical representation using a second layer column, a data coloring module stored on the memory that selects a visual attribute for a graphic, wherein the graphic represents a data value from a data column and the visual attribute of the graphic is selected to correspond to the data value, and a graphics setting module stored on the memory that renders the graphic, wherein the graphic is disposed in the graphical representation using the information stored in the first layer column and the second layer column.

17. The computer system of claim 16, further comprising a layer mapping module stored on the memory that shades the plurality of rows within the row map using the layer and sub-layer relationships amongst the plurality of rows, wherein the row map construction module constructs the row map using a plurality of layer columns comprising layer and sub-layer relationships.

18. A method for graphically displaying data from a textual data structure, the method comprising:
   transforming attributes of the textual data structure, wherein transforming the attributes comprises sorting information stored in the textual data structure into at least one layer column and at least one data column based on whether the information includes a data cell or a layer cell:
   constructing a column map for a graphical representation using a first layer column;
   constructing a row map for the graphical representation using a second layer column;

selecting a visual attribute for a graphic, wherein the graphic represents a data value from a data column and the color of graphic is selected to correspond to the data value upon which the graphic is based; and rendering the graphic, wherein the graphic is arranged in the graphical representation the information stored in the first layer column and the second layer column.

19. Application instructions on a tangible computer-readable medium, comprising: first instructions stored on the tangible computer-readable medium, the first instructions adapted to arrange information stored in a data structure into a first layer column and a second layer column and a data column; second instructions stored on the tangible computer-readable medium, the second instructions adapted to construct a column map for a graphical representation using the first layer column; third instructions stored on the tangible computer-readable medium, the third instructions adapted to construct a row map for the graphical representation the second layer column; fourth instructions stored on the tangible computer-readable medium, the fourth instructions adapted to select a visual attribute for a graphic, wherein the graphic represents a data value from the data column and a color of graphic is selected to correspond to the data value upon which the graphic is based; and fifth instructions stored on the tangible computer-readable medium, the fifth instructions adapted to render the graphic, wherein the graphic is arranged in the graphical representation using the information stored in the first layer column and the second layer column.

20. A computer system for providing a graphical representation of data, the computer system comprising: a memory; a processor; means for transforming attributes of a textual spreadsheet, wherein transforming the attributes comprises sorting information stored in the textual spreadsheet into at least one layer column and at least one data column based on whether the information includes a data cell or a layer cell; means for creating columns in a graphical representation using information stored in a first layer column, means for creating rows in the graphical representation using information stored in a second layer column, wherein the second layer column is associated with the first layer column; and means for creating a graphic on the graphical representation, wherein the graphic represents a data value stored in the at least one data column and wherein a visual attribute of the graphic corresponds to the data value that the graphic represents.

21. A method for graphically displaying data comprising:
transforming attributes of a textual data structure, wherein transforming the attributes comprises sorting information stored in the textual data structure into at least one layer column and at least one data column based on whether the information includes a data cell or a layer cell;
constructing a column map for a graphical representation using a first layer column;
constructing a row map for the graphical representation using a second layer column;
associating a plurality of graphical bars with a plurality of data values from the at least one data column, wherein the height of the plurality of graphical bars corresponds to the particular data value associated with the particular graphical bar;
coloring the plurality of graphical bars with a color corresponding to the data value associated with the particular graphical bar;
arranging the plurality of graphical bars in a row and column format, wherein the location of the plurality of graphical bars within row and column format is determined using the column map and the row map;
rendering the plurality of graphical bars; and
animating the plurality of graphical bars to automatically screen across a computer display.

\* \* \* \* \*

UNITED STATES PATENT AND TRADEMARK OFFICE
CERTIFICATE OF CORRECTION

PATENT NO. : 7,363,306 B1
APPLICATION NO. : 11/045563
DATED : April 22, 2008
INVENTOR(S) : Ming C. Hao et al.

It is certified that error appears in the above-identified patent and that said Letters Patent is hereby corrected as shown below:

In column 1, line 36, delete "axe" and insert -- are --, therefor.

In column 10, line 12, in Claim 14, delete "Visual" and insert -- visual --, therefor.

In column 10, line 28, in Claim 15, after "and" delete "the".

In column 10, line 63, in Claim 18, delete "cell:" and insert -- cell; --, therefor.

Signed and Sealed this

Twenty-eighth Day of April, 2009

JOHN DOLL
*Acting Director of the United States Patent and Trademark Office*